No. 764,913. Patented July 12, 1904.

UNITED STATES PATENT OFFICE.

SIDNEY B. CHAPMAN, OF ABBEVILLE, GEORGIA.

SOLUTION FOR PRESERVING LUMBER.

SPECIFICATION forming part of Letters Patent No. 764,913, dated July 12, 1904.

Application filed October 10, 1903. Serial No. 176,548. (No specimens.)

*To all whom it may concern:*

Be it known that I, SIDNEY B. CHAPMAN, a citizen of the United States, residing at Abbeville, in the county of Wilcox and State of Georgia, have invented certain new and useful Improvements in Solutions for Preserving Lumber; and I do hereby declare the following to be a full, clear, and exact description of the invention, such as will enable others skilled in the art to which it appertains to make and use the same.

This invention relates to improvements in preservative compounds for securing bright-sap lumber.

The object of the invention is the production of a compound possessing germicidal and preservative properties with respect to the particular fungi naturally forming upon sap-lumber, said compound possessing such properties in addition to the properties which the component parts of the compound possess independently.

The sap of several kinds of timber blacks immediately or very soon after being sawed. In other words, it is attacked by a fungus *Erysipheæ*—mildew or mold. Consequently the result is that the value of the lumber is greatly lessened and sometimes is rendered worthless. In producing this invention the object of the same is to obtain a formula which will destroy the fungi and render the lumber bright. This attack on the sap of the timber is commonly referred to as "blackening," "bluing," or "sap discoloration."

The term "sap" referred to in this specification designates that part of a tree which grows between the heart and the bark, consisting of a covering or ring from one to six inches in thickness, usually of a lighter color than the heart of a tree, and in some cases the entire tree is sap.

The composition is compounded as follows: water containing a solution of from one to twelve per cent. of a commercial sulfuric acid with sufficient corrosive mercuric chlorid to make the solution of the strength of one to five thousand and up to one to one thousand of the corrosive mercuric chlorid. Salicylic acid is also suspended in the solution in sufficient quantity to make the said solution contain from one-tenth per cent. to four per cent. of the said salicylic acid. Stating the proportion of the ingredients more clearly, ninety-three parts of water is mixed with seven parts of sulfuric acid, (acidum sulfuricum,) with the addition of enough corrosive mercuric chlorid to make the above solution contain one part of corrosive mercuric chlorid to two thousand of the above solution.

The solution of the above substances in water is to be sprinkled or sprayed on the lumber until the surface of said lumber is entirely covered thereby as the same comes from the saw, or, if it is preferred, the lumber may be submerged in a vat containing the above substances. The lumber can also be fumigated with some or all of the above substances after it is stacked.

Having thus fully described my invention, what I claim as new, and desire to secure by Letters Patent, is—

1. A germicidal and preservative compound for sap-lumber comprising solution of water, sulfuric acid, mercuric chlorid, and salicylic acid.

2. A germicidal and preservative compound for sap-lumber comprising a solution of approximately ninety-three parts water, seven parts sulfuric acid, and a relatively small quantity of mercuric chlorid and salicylic acid.

In testimony whereof I hereunto affix my signature in presence of two witnesses.

SIDNEY B. CHAPMAN.

Witnesses:
J. R. MONROE,
F. E. TAYLOR.